Sept. 6, 1966  V. E. ACKLES  3,270,863
CONVEYOR DRIVING UNIT
Filed June 22, 1964  3 Sheets-Sheet 1

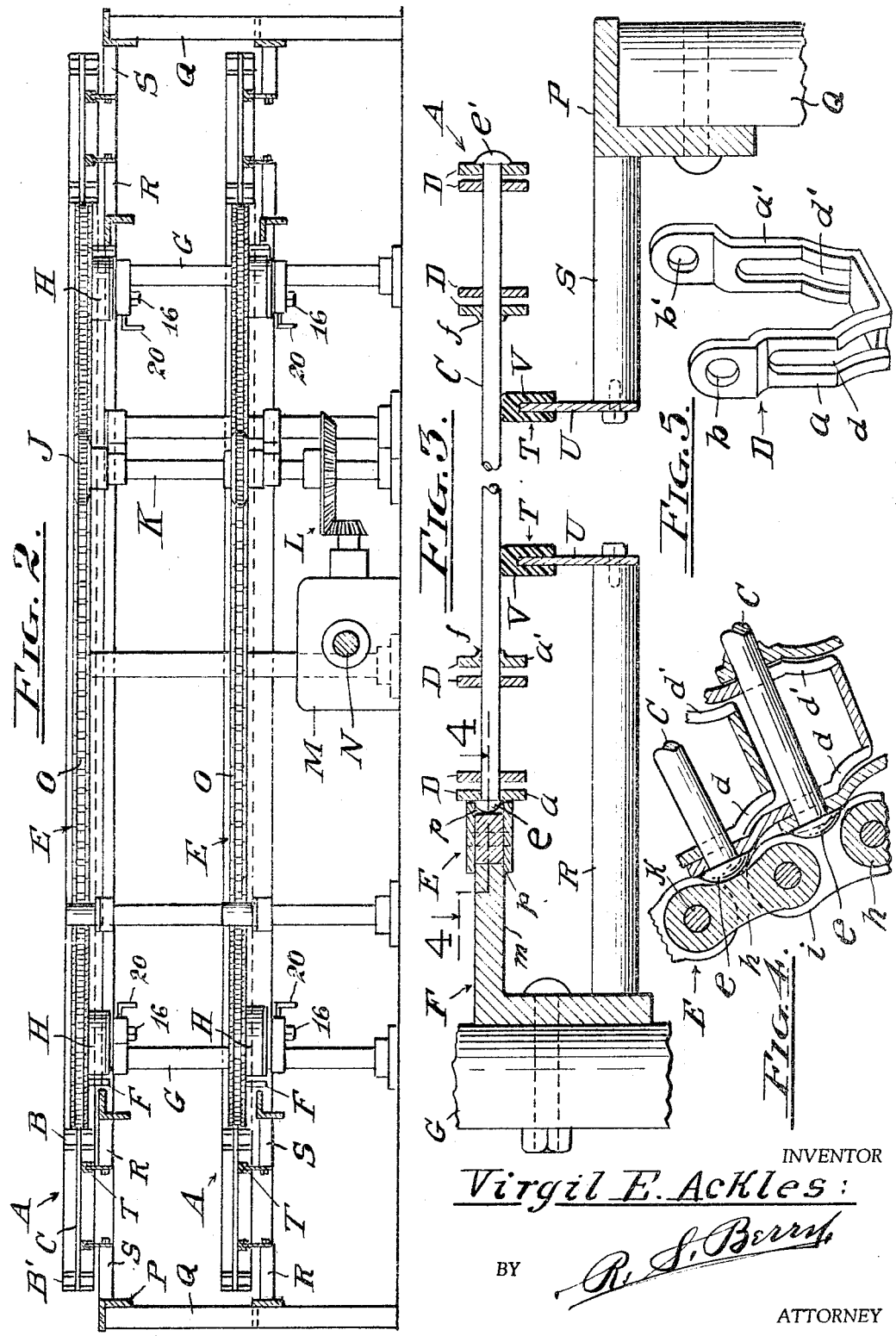

Sept. 6, 1966   V. E. ACKLES   3,270,863
CONVEYOR DRIVING UNIT
Filed June 22, 1964   3 Sheets-Sheet 3
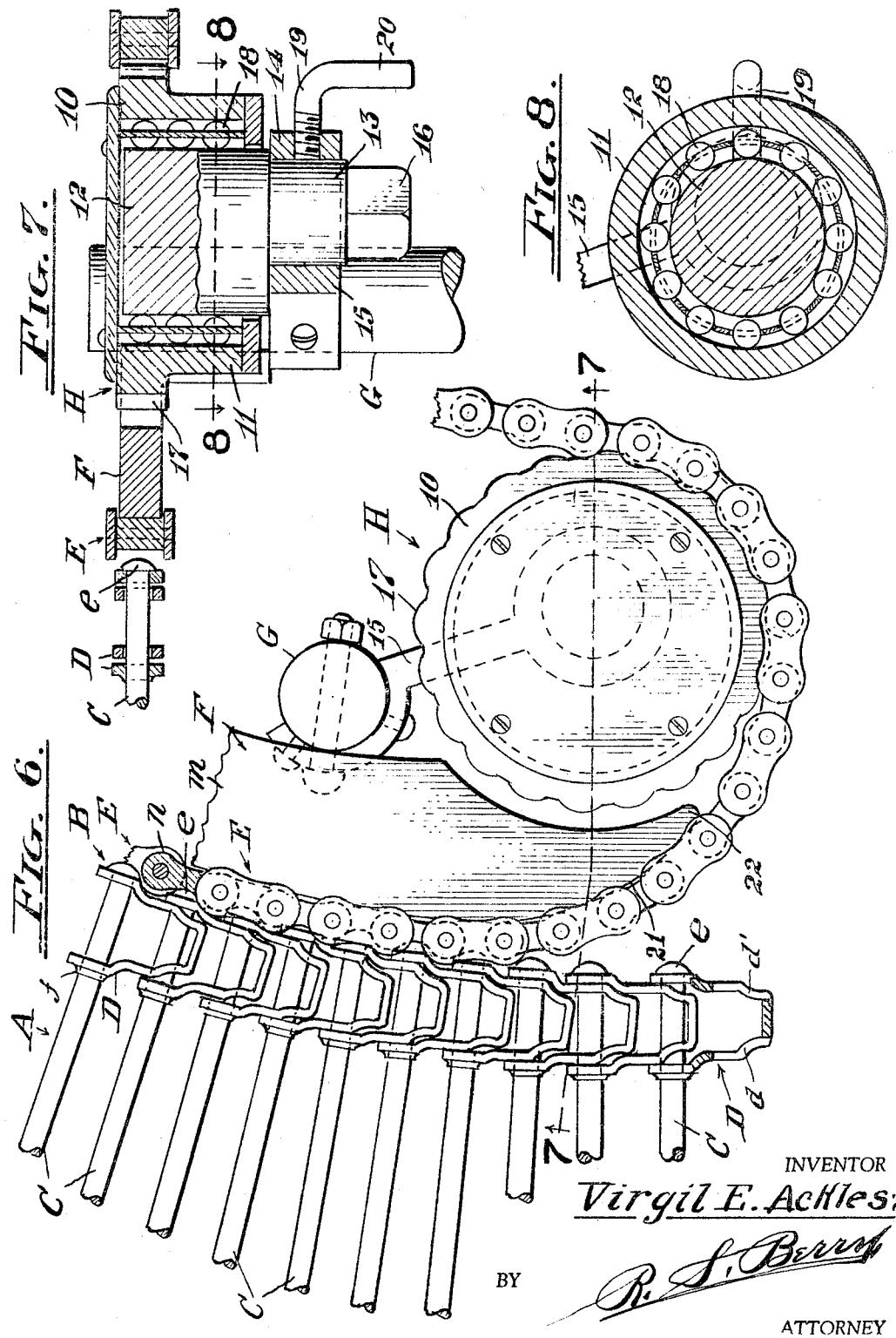
INVENTOR
Virgil E. Ackles
BY R. S. Berry
ATTORNEY 3,270,863
CONVEYOR DRIVING UNIT
Virgil E. Ackles, 15899 S. San Pedro St.,
Los Angeles, Calif.
Filed June 22, 1964, Ser. No. 376,894
1 Claim. (Cl. 198—203)

This invention relates to a mechanism for driving link conveyor belts and particularly such belts as are adapted to traverse a curved path of travel on a horizontal plane as in rounding a corner or reversing its direction of travel rounding a bend on a horizontal arc.

Heretofore such conveyor belts have usually been directed around the perimeters of horizontal cylindrical wheels, sometimes constituting idlers and sometimes utilized as drivers. Where such belts are several feet in width the directing wheels are necessarily of such large diameter and weight as to require costly supporting framework and bearings.

The primary object of the invention is to provide a mechanism whereby a link conveyor belt may be driven in a horizontally extending arcuate path of travel without the use of objectionable mammoth direction wheels as commonly employed and which mechanism is compact, relatively light in weight in proportion to its dimensions and is of such character as to be easily transported in knock-down condition and readily assembled.

A particular object of the invention is to provide a conveyor belt drive wherein a conventional sprocket chain may be utilized in direct positive geared relation to a conventional link or chain conveyor belt in lieu of a rotary wheel or drum, as commonly employed, with the sprocket chain directly engaged throughout a portion of its length with the inner arcuate marginal portion of the belt extending on a horizontal arc, and to provide a simple and effective means whereby the sprocket chain may be readily adjusted longitudinally to dispose the links thereof in proper register with spaced protrusions on the margin of the belt.

With the foregoing objects in view, the invention is illustrated by way of example in the accompanying drawing in which:

FIG. 2 is a view in elevation partly in section of the structure shown in FIG. 1:

FIG. 3 is a detail in cross section as seen on the line 3—3 of FIG. 1 with portions broken away:

FIG. 4 is a detail in horizontal section as seen on the line 4—4 of FIG. 3:

FIG. 5 is an isometric view of one of the links of the chain conveyor belt, showing it detached:

FIG. 6 is an enlarged plan view with parts removed of the portion of FIG. 1 bounded by the rectangular dot-and-dash line designated by numeral 6:

FIG. 7 is a detail in cross section partly in elevation with parts removed as seen on the line 7—7 of FIG. 6: and FIG. 8 is a cross section taken on the line 8—8 of FIG. 7.

Figure 1:
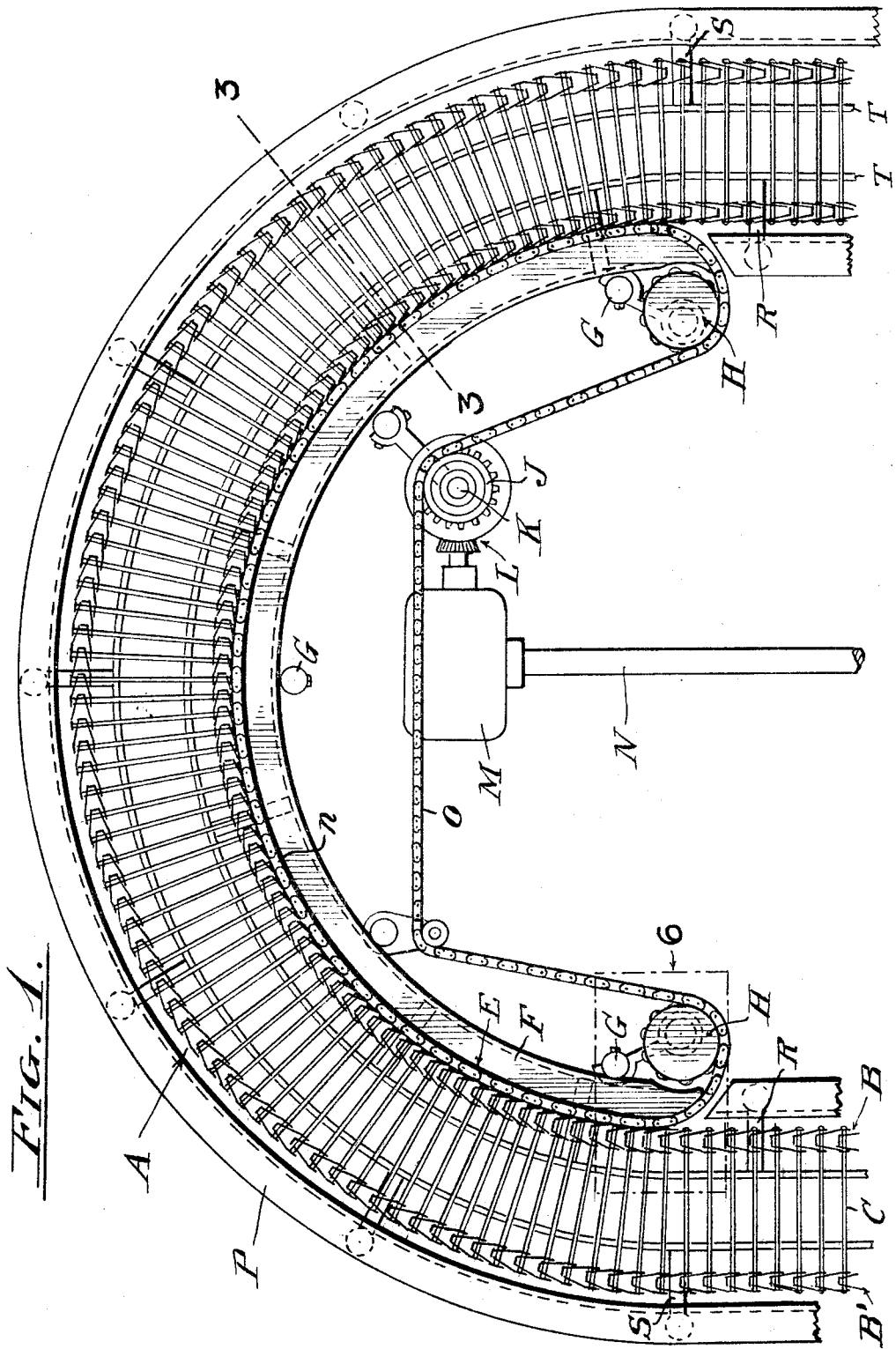
FIG. 1 is a plan view of a fragmentary portion of an endless link conveyor belt showing the driving mechanism applied.

Referring to the drawings more specifically A indicates generally a conventional link conveyor belt which embodies a pair of spaced parallel chains B–B' constituting the longitudinal inner and outer side margins respectively of the belt. A multiple of spaced transverse cylindrical rods C extend between and are connected at their ends to the chains B–B', which rods constitute the body portion of the belt on which objects to be conveyed are supported.

A feature of the belt A resides in the construction and assemblage of the chains B–B' and rods C whereby the belt is rendered capable of traversing a horizontal arcuate path of travel, as in rounding a bend as depicted in FIG. 1.

To accomplish this feature, at least the innermost chain B is composed of a multiple of generally U-shaped links D, particularly shown in FIG. 5, which links are arranged in line with their open ends overlying the closed ends of adjacent links and having their overlapping side members $a$–$a'$ united by the end portions of the rods C which pass through opposed circular openings $b$–$b'$ in the side members $a$–$a'$ in the links D, the margins of which openings snugly conform to the rods C. The end portions of the rods also loosely pass through elongate slots $d$–$d'$ extending longitudinally of the side members of the adjacent links. The outer ends of the rods C have rivet heads $e$–$e'$ which overlie the outer faces of the outer side members of the overlying portions of the links and protrude therefrom thereby affording projections which are utilized in carrying out the invention as will be later described.

The end portions of the rods C extending through the slots $d$–$d'$ constitute a slidable connection between adjacent links D whereby the inner chain B is rendered longitudinally contractible relative to the links of the outer chain B' in order that the inner chain B may traverse an arc of lesser radius than that of the outer chain B' when the belt is caused to traverse an arcuate path of travel, as shown in FIG. 1.

The links D are fixed on the rods C by crimping annular flanges $f$ provided on the outer faces of the inner side members of the links which flanges surround the opening $b'$ through which the rods pass; the flanges $f$ being pressed into gripping engagement with the rods and cooperating with the heads $e$–$e'$ to fasten the links against movement relative to the rods to which they are secured both longitudinally and circumferentially thereof. However, the rods are loose in the slots $d$–$d'$ to permit turning movement of the rods in the slots and also permit longitudinal movement of the overlying end portions of adjacent links D relative to each other.

The conevyor belt A above described and illustrated in the drawings is disclaimed per se; the present invention having to do with a mechanism for driving the belt A or its equivalent. The conveyor belt A is slidably supported in an elevated position for longitudinal movement on a pair of rails T—T as will be later described.

In carrying out the present invention, advantage is taken of the projecting rivet heads $e$ on the inner chain B, which heads admirably serve as sprockets for engagement with the links of a conventional sprocket chain E which is utilized as a means for driving the belt conveyor A.

The sprocket chain E comprises the usual arrangement of inner links $h$ disposed end-to-end in spaced relation to each other with adjacent links $h$ connected together by a pair of outer links $i$ overlying opposite sides of the links $h$; the links $h$ and $i$ being joined by pivot pins $k$ whereby the chain E is rendered articulate. The outer links $i$ are slightly wider than the inner links $h$ and have their side margins projecting outwardly from the sides of the inner links $h$ whereby the chain E is provided, in effect, with longitudinal side channels $p$.

To accomplish the driving purpose of the chain E, a fixed arcuate guide rail F is provided, here shown as comprising an angle iron fixedly carried horizontally on stationary upright standards G with the margin of a web portion $m$ thereof outermost and constituting a convex rail with which the channeled inner side of the sprocket chain E is slidably engaged, as particularly shown in FIG. 3. The sprocket chain E is endless and has an arcuate run $n$ which slidably extends lengthwise along the outer margin of the rail F from end to end thereof, and having a length $o$ leading between the spaced ends of the rail F. A pair of direction rollers H—H are arranged adjacent the ends of the rail F around which the length $o$ of chain E is passed, which rollers are eccentrically mounted for adjustment to effect bodily longitudinal shifting of the chain E forth or back independent of its driving movement, as will presently be described.

A sprocket wheel J engages the run $o$ of the chain E, which wheel is mounted on a shaft K rotated from any suitable source of power through gears L whereby the chain is driven so as to cause the run $n$ thereof to traverse the rail F. As here shown, the gears L are driven through conventional reduction gears in a gear box M from a motor driven shaft N.

The above recited assembly of the arcuate rail F and sprocket chain E is arranged with the outer side of the run $n$ of the chain E abutting the inner margin of the chain B of the conveyor A with the sprocket like projections or heads $e$ on the chain B engaged with the adjacent side of the sprocket chain E as particularly shown in FIG. 4; the run $n$ of the sprocket chain E being thus interposed between the rail F and the inner margin of the conveyor belt A and disposed with the side margins of the links $h$–$i$ presented laterally with one side of the sprocket chain E engaged by the web $m$ of the rail F and with the other side engaged by the heads $e$ on the inner margin of the conveyor belt A.

Extending opposite the guide rail F in outwardly spaced relation thereto is a rail P supported on standards Q and projecting from the facing sides of the rails F–P at spaced intervals along the length thereof are brackets R and S respectively which project beneath the conveyor belt A on which the pair of rails T—T are mounted, as particularly shown in FIG. 3.

Each of the rails T—T embodies a plate U extending between and attached flatwise to the outer ends of the brackets R–S and having a plastic runner V mounted on and extending throughout its upper edge on which the bars C of the conveyor A slidably seat.

The direction disks H—H, particularly shown in FIGS. 6, 7 and 8, each embodies a horizontal circular disk 10 having a concentric cylindrical hub 11 revolubly mounted on a stud-shaft 12 carried on a stem 13 in offset or eccentric relation thereto. The stem 13 is turnably mounted in a bearing 14 carried on a bracket 15 projecting from and affixed to one of the standards G. The stem 13 has a flat faced end portion 16 which projects from the bearing 14 and which constitutes a wrench-hold whereby the stem 13 and the eccentric stud-shaft 12 may be turned to shift the disk 10 laterally and thereby advance the sprocket chain E lengthwise; the disk 10 having serrations 17 on its circular margin engaged with the sprocket chain E whereby longitudinal travel of the chain will effect rotation of the disk 10.

The arcuate rail F terminates adjacent the direction rollers H—H and has the outer margins 18 of its end portions curved outwardly away from the inner margin of the conveyor belt, as particularly shown in FIG. 6 with the tips 19 of the curved ends proximate the periphery of the disk 10 whereby the portion of the chain advancing from one of the disks 10 will be directed onto the leading end of the rail F while the portion of the chain advancing from the trailing end of the rail F will be directed onto the other disk 10. By the foregoing recited construction the sprocket chain E is directed at an angle in and out of engagement with the heads $e$ on the inner margin of the conveyor belt.

Where the conveyor belt has straight portions leading to and from the arcuate portion the ends of the arcuate run of the sprocket chain connect with and disconnect from the conveyor belt at the intersection of the straight and arcuate portions thereof, since the links of the inner margin B of the conveyor belt are extended on the straight portion of the belt and are contracted on its arcuate portion.

The direction disks H—H, particularly shown in FIGS. 6, 7 and 8, each embodies a horizontal circular disk 10 having a concentric cylindrical hub 11 revolubly mounted on a stud-shaft 12 carried on a stem 13 in offset or eccentric relation thereto. The stem 13 is turnably mounted in a bearing 14 carried on a bracket 15 projecting from and affixed to one of the standards G. The stem 13 has a flat faced end portion 16 which projects from the bearing 14 and which constitutes a wrench-hold whereby the stem 13 and the eccentric stud-shaft 12 may be turned to shift the disk 10 laterally.

In initially assembling the sprocket chain E relative to the conveyor belt A it may be necessary to shift the chain E longitudinally to dispose the links of the chain in proper seating engagement with the heads $e$ on the conveyor belt. To accomplish this either one or both of the direction rollers is shifted laterally by rotating the stem 13 to cause the eccentric stud-shaft 12 to shift the disk 10 bodily and thereby advance the sprocket chain E lengthwise relative to the conveyor belt A.

Ball bearings 18 are interposed between the hub 11 and the stud-shaft 12. A set-screw 19 is threaded through the bearing 14 for engagement with the stem 13 to normally hold the latter fixed against turning. The set-screw has a stem 20 whereby it may be manually screwed in and out of engagement with the stem 13. The disk 10 has serrations 17 on its circular margin engaged with the sprocket chain E whereby longitudinal travel of the chain will effect rotation of the disk 10.

The arcuate rail F terminates adjacent the direction rollers H—H and has the outer margins 21 of its end portions curved outwardly away from the inner margin of the conveyor belt, as particularly shown in FIG. 6 with the tips 22 of the curved ends proximate the periphery of the disk 10 whereby the portion of the chain advancing from one of the disks 10 will be directed onto the leading end of the rail F while the portion of the chain advancing from the trailing end of the rail F will be directed onto the other disk 10. By the foregoing recited construction the sprocket chain E is directed at an angle in and out of engagement with the heads $e$ on the inner margin of the conveyor belt.

Where the conveyor belt has straight portions leading to and from the arcuate portion the ends of the arcuate run of the sprocket chain connect with the disconnect from the conveyor belt at the intersection of the straight and arcuate portions thereof, since the links of the inner margin B of the conveyor belt are extended on the straight portion of the belt and are contracted on its arcuate portion. For this reason the heads $e$ on the inner margin of the conveyor belt are spaced further apart when the links are extended than when the links are contracted.

In order that proper driving interengagement of the heads $e$ and sprocket chain E be insured it is essential that the spacing between the longitudinal centers of adjacent links $h$ and $i$ of the sprocket chain be such that when the normally spaced heads $e$ advance into engagement with the links the adjacent heads $e$—$e$ will be urged toward each other to thereby advance a following link D relative to a preceeding link, as indicated in FIG. 4, thereby contracting the inner conveyor chain B relative to the outer chain B' throughout the length of inner margin of the arcuate portion of the conveyor belt.

The invention is particularly applicable for use in driving superimposed lengths of conveyor belts as illustrated in FIG. 2 wherein an arrangement of complementary conveyor belts A—A and sprocket chain driving mechanism is shown as correspondingly mounted and actuated in common from a source of power through the shaft K.

The conveyor belt A is necessarily endless and accordingly embodies an arcuate return portion like that shown in FIG. 1 not necessary to be here shown, which return portion may be driven by a sprocket chain driving mechanism corresponding to that shown in FIG. 1.

The portion of the endless conveyor belt leading from the arcuate portion thereof is subjected to a pull, whether by the pulling action of the sprocket chain E on the portion of the conveyor belt leading to the sprocket chain or by another belt driver, which pull restores the links D of the inner chain B to their normal extended relation to each other.

The operation of the invention is apparent from the foregoing, it being obvious that on driving the sprocket chain E the conveyor belt A will be advanced in unison therewith by reason of the interengagement of the links of the sprocket chain with the heads *e* projecting from the inner side of the conveyor.

I claim:

A mechanism for driving a link conveyor having a portion traversing a horizontal arc and having an arcuate inner margin with a multiple of spaced projections on said margin, comprising an endless sprocket chain having an arcuate run abutting said arcuate margin and engaged at intervals throughout its length with said projections, said sprocket chain also having a length connecting the ends of said arcuate run, means engaging said length of chain for driving the latter and thereby propelling said conveyor, a fixed arcuate rail slidably abutting the inner side of said arcuate run for holding said run in engagement with said projections, direction rollers at the ends of said arcuate rail around which said sprocket chain is passed, said direction rollers each embodying a concentrically mounted hub, stud-shafts on which said hubs are eccentrically mounted in fixed relation thereto, said stud-shafts being adapted to be turned to shift said direction rollers to adjust said sprocket chain longitudinally relative to said conveyor, and means for detachably securing said stud-shafts against rotation to releasably hold said hubs in fixed positions.

References Cited by the Examiner
UNITED STATES PATENTS

| | | | |
|---|---|---|---|
| 1,939,315 | 12/1933 | Paulson | 198—203 |
| 2,446,890 | 8/1948 | Stadelman | 198—182 |
| 2,530,786 | 11/1950 | Rose | 198—203 X |
| 3,225,898 | 12/1965 | Roinestad | 198—181 |

EVON C. BLUNK, *Primary Examiner.*

EDWARD A. SROKA, *Examiner.*